(12) United States Patent
Lockett et al.

(10) Patent No.: US 6,314,756 B1
(45) Date of Patent: Nov. 13, 2001

(54) STRUCTURED PACKING WITH ASYMMETRIC CRIMP PATTERN

(75) Inventors: Michael James Lockett, Grand Island; John Fredric Billingham, Getzville, both of NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/656,943

(22) Filed: Sep. 7, 2000

(51) Int. Cl.[7] .................. F25J 3/00; F25J 5/00; F02M 29/04; B01D 47/06
(52) U.S. Cl. .................. 62/643; 62/906; 261/112.2
(58) Field of Search .................. 62/643, 906; 261/112.2

(56) References Cited

U.S. PATENT DOCUMENTS

| | | | |
|---|---|---|---|
| 2,231,088 | * 2/1941 | Richardson | 261/112.2 |
| 3,106,242 | * 10/1963 | Jenssen et al. | 261/112.2 |
| 3,249,155 | * 5/1966 | Huet | 261/112.2 |
| 3,466,019 | * 9/1969 | Priestley | 261/112.2 |
| 3,555,786 | * 1/1971 | Cochran | 261/112.2 |
| 4,296,050 | 10/1981 | Meier | 261/112 |
| 4,455,339 | 6/1984 | Meier | 428/185 |
| 4,915,878 | 4/1990 | György | 261/112.2 |
| 4,929,399 | 5/1990 | Lockett et al. | 261/112.2 |
| 5,132,056 | 7/1992 | Lockett et al. | 261/112.2 |
| 5,413,741 | 5/1995 | Buchholz et al. | 261/112.2 |
| 5,632,934 | 5/1997 | Billingham et al. | 261/112.2 |
| 5,876,638 | 3/1999 | Sunder et al. | 261/112.2 |
| 5,921,109 | * 7/1999 | Billingham et al. | 62/643 |
| 6,101,841 | 8/2000 | Billingham et al. | 62/643 |

* cited by examiner

*Primary Examiner*—William Doerrler
(74) *Attorney, Agent, or Firm*—Stanley Ktorides

(57) ABSTRACT

A corrugated structured packing for forming into modules for use in a rectification column, having a crimp pattern which is asymmetrical about a line drawn perpendicular to the centerline of the structured packing sheet and whose axial distance along the centerline from trough to adjacent peak is not evenly divided on either side of the centerline, serving to reduce pressure losses that are not efficient in promoting mass transfer and thus reducing the requisite column height.

8 Claims, 3 Drawing Sheets

STRUCTURED PACKING WITH ASYMMETRIC CRIMP PATTERN

TECHNICAL FIELD

This invention relates generally to structured packing which is particularly useful for use in carrying out rectification, especially cryogenic rectification.

BACKGROUND ART

Cross-corrugated, sheet metal structured packings have gained a considerable portion of the distillation column internals business since coming into widespread commercial use approximately fifteen years ago. These structured packings are commonly recognized as being more efficient than random packings, based on their lower pressure drop per theoretical stage of separation. They have also replaced trays in some applications, primarily because of their higher capacity in a given column diameter, at least at low to medium liquid rates.

One industry where structured packings have had a major impact is the cryogenic air separation industry. The primary advantage of structured packings in cryogenic air separation is that the pressure drop over the columns may be an order of magnitude lower than when using the previous column internals of choice in cryogenic air separation columns, which were trays. This reduces the operating pressure of the columns, which in turn drops the pressure to which air must be compressed and thus the power requirements for the plant.

Meier (U.S. Pat. No. 4,296,050) describes the majority of structured packings sold commercially to this point, which are cross-corrugated sheets containing both apertures and fluting (a form of surface texture). Since the nearly twenty years since this patent, numerous attempts to improve on the basic structure of the structured packing have been published. However, none appear to have had a significant commercial impact until Billingham et al. (U.S. Pat. No. 5,632,934). It was recognized in this patent that flooding of structured packings was initiated at the interface between layers and that this bottleneck could be removed by reducing the pressure drop of gas in the base of each brick. Since the issuance of this patent, two products have been commercialized that use the ideas put forward in this patent.

It would be desirable to have structured packing which will improve the mass transfer achieved for a given pressure drop by minimizing pressure losses that are not efficient in promoting mass transfer, thereby resulting in the use of smaller distillation columns.

Accordingly, it is an object of this invention to provide corrugated structured packing, having an improvement over conventional corrugated structured packing, which enables separation such as cryogenic rectification to be carried out over a reduced column height.

SUMMARY OF THE INVENTION

The above and other objects, which will become apparent to those skilled in the art upon a reading of this disclosure, are attained by the present invention, one aspect of which is:

A corrugated structured packing sheet having a crimp pattern which is asymmetrical about a line drawn perpendicular to the centerline of the structured packing sheet and through the apex of either a corrugation peak or corrugation trough, and wherein the distance along the centerline from the apex of a corrugation trough to the apex of an adjacent corrugation peak is not evenly divided by the point where the crimp pattern crosses the centerline between said corrugation trough and said corrugation peak.

Another aspect of the invention is:

A method for carrying out rectification comprising:

(A) passing a feed mixture comprising a more volatile component and a less volatile component into a column containing a plurality of modules, each module comprising a plurality of vertically oriented corrugated structured packing sheets, each structured packing sheet having a crimp pattern which is asymmetrical about a line drawn perpendicular to the centerline of the structured packing sheet and through the apex of either a corrugation peak or corrugation trough, and wherein the distance along the centerline from the apex of a corrugation trough to the apex of an adjacent corrugation peak is not evenly divided by the point where the crimp pattern crosses the centerline between said corrugation trough and said corrugation peak;

(B) carrying out rectification within the column wherein vapor flows upward through the modules and liquid flows downward through the modules whereby the said more volatile component concentrates in the upflowing vapor and the said less volatile component concentrates in the downflowing liquid; and (C) withdrawing first fluid from the upper portion of the column, said first fluid having a concentration of more volatile component which exceeds that of the feed mixture, and withdrawing second fluid from the lower portion of the column, said second fluid having a concentration of less volatile component which exceeds that of the feed mixture.

The term "column" as used herein means a distillation or fractionation column or zone, i.e. a contacting column or zone wherein liquid and vapor phases are countercurrently contacted to effect separation of a fluid mixture, as for example, by contacting of the vapor and liquid phases on packing elements. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13–3 *The Continuous Distillation Process*. Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is rectification carried out, at least in part, at temperatures below 150° K.

As used herein the term "packing" means any solid or hollow body of predetermined configuration, size and shape used as column internals to provide surface area for the liquid to allow mass transfer at the liquid-vapor interface during countercurrent flow of the two phases.

As used herein the term "structured packing" means diagonally cross-corrugated packing wherein individual members have specific orientation relative to each other and to the column axis.

As used herein the terms "upper portion" and "lower portion" of a column mean those sections of the column respectively above and below the mid point of the column.

As used herein the term "corrugation" means a fold, either a peak or a trough, on a packing sheet.

As used herein the term "centerline" means the line formed if a corrugated structured packing sheet were flattened so as to remove all the corrugations.

As used herein the term "apex" means the furthest perpendicular distance of a corrugation from the centerline of the packing sheet.

DETAILED DESCRIPTION

Figure 1:
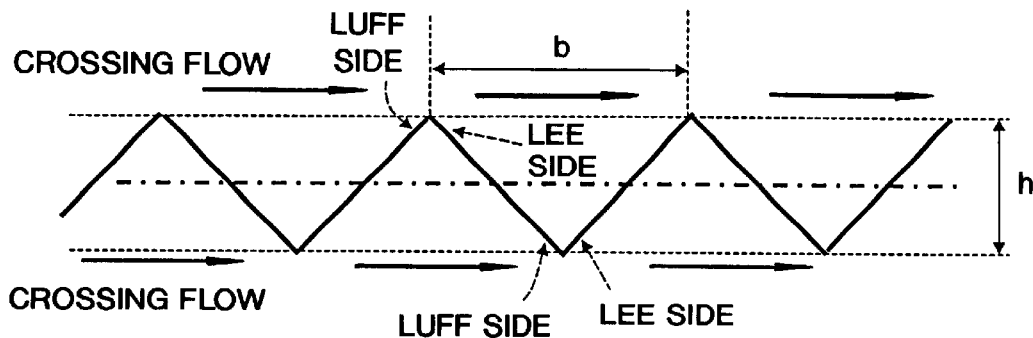
FIGS. 1, 2 and 3 are views taken in a plane perpendicular to the corrugation direction of known structured packing sheets.

The invention will be described in detail with reference to the Drawings.

Cross-corrugated structured packing sheets are formed into bricks or modules. Each brick comprises a plurality of vertically orientated, diagonally cross-corrugated packing sheets. The sheets are stacked, side-by-side, such that the direction of the corrugation is reversed in neighboring sheets. In so doing, the sheets define a plurality of crossing passages through which rising gas can flow. The bricks of packing are installed into a column as layers that fill the cross sectional area of the column. Each layer may be a single brick or, in larger columns, several bricks that when placed side-by-side fit a circular cross-section. These layers are stacked, one on top of the other, to give the required packed height. Adjacent layers are rotated such that the sheets in the bricks comprising the layers are not parallel. The degree of rotation is between 45 and 90 degrees, and more typically 90 degrees.

Cross-corrugated structured packings are used in the countercurrent flow of two fluids to effect heat and mass transfer. The fluid streams are typically gas and liquid but they could be two liquid phases. A similar geometry is also utilized in plate heat exchangers. In these applications the fluid stream is typically single-phase. Two types of flow patterns that exist for single phase flow have been identified: a crisscrossing flow where gas streams travel in opposite orientations to the net flow direction along the corrugations of the first and second sheet; and a zigzag flow where the gas crosses from sheet to sheet as it passes up through the packing.

The first pattern dominates at small corrugation angles (measured to the vertical), the second at large corrugation angles. In practice the actual flow pattern for intermediate corrugation angles (30°<θ<60°) will be a mixture of the two types of flow. The corrugation angle is the angle that the diagonals formed in the packing sheets make with the vertical.

It is important to make a distinction between surface texture and the crimp pattern. Surface textures are applied to all commercially available sheet metal structured packings. The aim of this texture is to promote liquid spreading and thus utilize all of the available packing area for mass transfer. There are various types of surface texture. The most common type is fluting, where the sheet material contains waves that are generally sinusoidal in nature. The texture is applied to the base material, through rolling or pressing, prior to applying the crimp that forms the basic structure of the packing. Since the aim of the texture is to spread liquid, the scale of the texture is on the order of the thickness of the liquid film. As such, the dimensions of the texture are significantly smaller than the dimensions of the crimp pattern. One can think of the texture as being superimposed on the actual crimp pattern. It is the latter that defines macroscopic geometry of the structured packing and the passages for gas flow.

Figure 2:
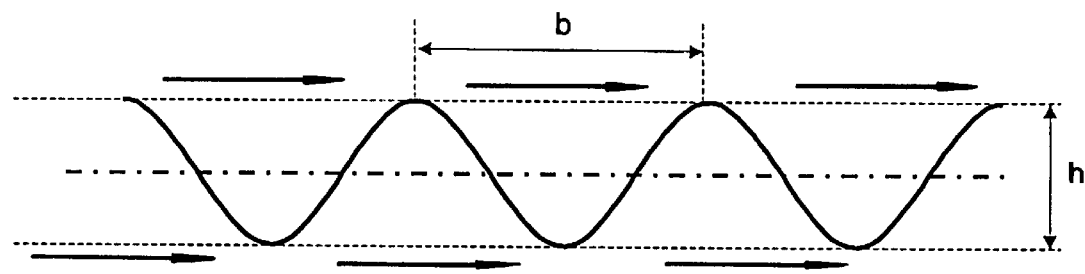
Figure 3:
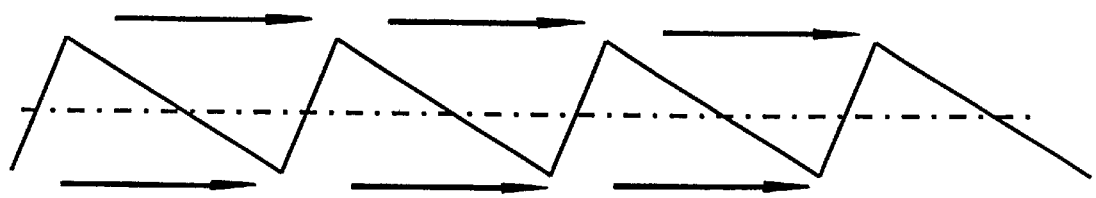

FIGS. 1, 2 and 3 give examples of conventional crimp patterns for structured packing. The view is taken in a plane that is perpendicular to the direction of the corrugations. FIG. 1 illustrates a triangular crimp. FIG. 2 illustrates a sinusoidal shape. FIG. 3 shows a sawtoothed pattern shape. Studies on corrugated sheet metal give results which indicate a variation in the local mass transfer coefficient, and by analogy the heat transfer coefficient, over the packing surface. In particular, the heat and mass transfer coefficients are greater on the luff side of the crest than on the lee side. The luff side of the crest is defined as that side of the corrugation crest that faces the crossing gas flow. The lee side is the opposite, sheltered side of the crest.

Two of the components of pressure drop resulting from flow through packing are viscous drag and form drag. Viscous drag results from skin friction between the fluid and the surface of the packing or liquid film. Form drag results from circulating eddies that form in a fluid when it impinges on a solid surface. The magnitude of this form drag is strongly dependent on the shape of the obstacle and the direction of flow. In designing heat and mass transfer equipment, form drag is normally considered to be an inefficiency since pressure loss resulting from form drag is less effectively translated into increased heat and mass transfer coefficients than pressure loss caused by viscous drag.

Referring to the structured packing shown in FIG. 3, the direction of the crossing flows of adjacent sheets is again represented as arrows. One can see that the shape of the surface is different for the two flows. One side (the top-side as shown) sees a sharp, oblique face on the luff side and a more gradual decline on the lee side. The crossing flow on the other side sees the exact opposite. We expect that these two flow paths offer up different resistances to flow. This is because the form drag is strongly dependent on the shape of the obstacle and the direction of flow. In practice the pressure drop through the packing will be approximately equal, irrespective of which side of the sheet the gas flows. Different resistance to flow will thus result in gas flowing preferentially across one side of the packing compared to the other. Any deviation from uniform flow in heat and mass transfer equipment is known as maldistribution. It is well known in the art that flow maldistribution is detrimental to the overall heat and mass transfer performance. In practice, form drag may be less across one face but more across the other.

Figure 4:
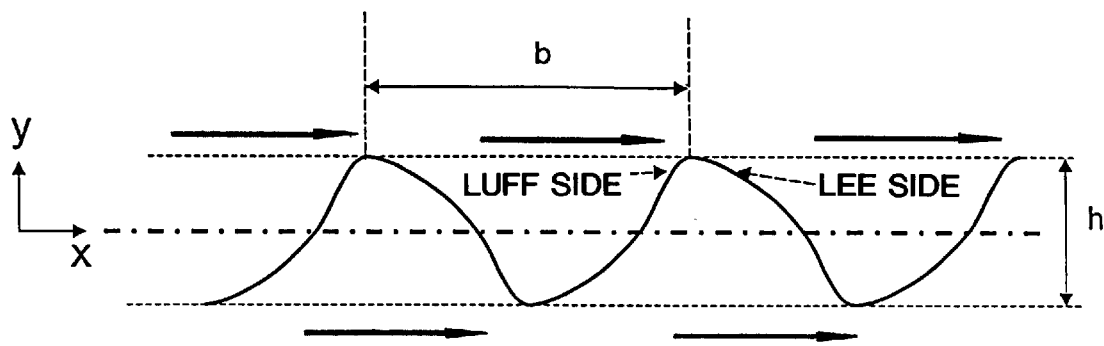
FIG. 4 is a view taken in a plane perpendicular to the corrugation direction of one embodiment of a sheet of structured packing of the invention.

One embodiment of the invention is shown in FIG. 4. This is a single sheet of packing drawn in a plane that is perpendicular to the corrugation direction. The packing sheet is characterized by a luff side of the corrugation that has a different shape than the lee side of the corrugation, and a shape which is (substantially) identical for the crossing flows in a given direction on either side of the sheet.

The patterns shown in FIGS. 1 and 2 satisfy neither criterion, and the pattern shown in FIG. 3 satisfies the first criterion but not the second.

Referring now to the crimp pattern of FIG. 4, it is seen that it is asymmetrical about a line drawn perpendicular to the centerline of the packing sheet, and through an apex of a peak or trough of the sheet. In addition, the distance along the centerline from the apex of a corrugation trough to the apex of an adjacent corrugation peak is not evenly divided by the point where the crimp pattern crosses the centerline between such corrugation trough and corrugation peak. Preferably, as shown in FIG. 4, the packing sheet is substantially symmetrical about the packing centerline, although it is 180° out of phase. Thus the packing presents the same resistance to the crossing flow on both sides of the sheet and thus flow does not preferentially flow along either face.

Figure 5:
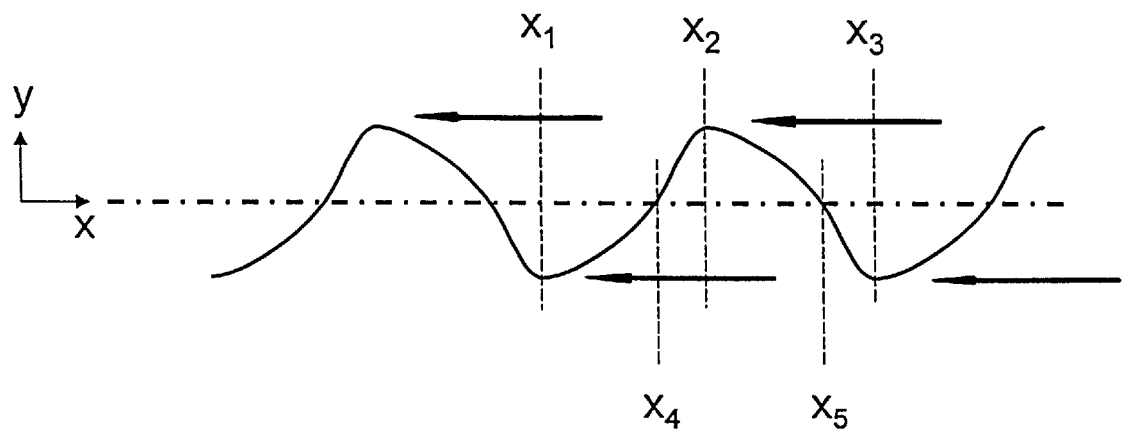
FIG. 5 is a view taken in a plane perpendicular to the corrugation direction of another embodiment of a sheet of structured packing of the invention.

One feature of this packing is that, while the crossing flows on both sides of the sheet experience the same surface shape, if the direction of the gas flow is reversed (by for example installing the packing in the opposite orientation), a different performance is expected. Gas flowing in the opposite direction is shown in FIG. 5. Comparing to the packing of FIG. 3, we can see that crossing flows across both faces see the same shape and thus experience the same pressure drop. In addition, it is expected that one of the flow orientations will offer up less form drag than the conventional packing, yielding superior performance. Either orientation could potentially be superior depending on the specific application; gas and liquid rate, gas and liquid physical properties, θ, b/h etc. In practice, one can test the packing in both orientations (by simply reinstalling the packing "upside down") to find out which is the appropriate orientation for that specific application.

Referring to FIG. 5 to define the shape mathematically, the following positions along the packing centerline are defined as:

- $x_1$ position of a trough apex
- $x_2$ position of an adjacent peak apex
- $x_3$ position of the following trough apex The baselength of the packing, b, is defined as the distance between adjacent troughs (or equivalently adjacent peaks). Thus, $$b = x_3 - x_1 \quad (1)$$

Although the pattern is asymmetric, the axial location of the peak between the troughs is midway between the two troughs, $$x_2 = \frac{x_1 + x_3}{2} \quad (2)$$

We now define two further points;

- $x_4$ position between a first trough apex and an adjacent peak apex where the crimp pattern crosses the packing centerline
- $x_5$ position between the peak apex and a second trough apex where the crimp pattern crosses the centerline.

In the invention, the following inequalities hold;

$$x_4 - x_1 \neq x_2 - x_4 \quad (3)$$

$$x_5 - x_2 \neq x_3 - x_5 \quad (4)$$

Comparing to the prior art, the conventional crimp patterns of FIGS. 1 and 2 satisfy equations 1 and 2 but not the relationships 3 and 4 (the expressions on either side are equivalent in these cases). Comparing to the sawtooth pattern of FIG. 3, equation 1 holds but equations 2, 3 and 4 do not.

It is expected that a packing made in accordance with the current invention will have a higher capacity without loss of mass transfer performance than an otherwise similar packing that has a symmetric crimp pattern and that the magnitude of the advantage will be in the range 2–15%, depending on the system.

The packing can be characterized in terms of a ratio, R, defined as;

$$R = \frac{x_4 - x_1}{x_2 - x_4} \quad (5)$$

where $x_i$ are distances along the centerline, as defined previously, and the positive direction for these measurements being chosen such that R is greater than or equal to unity ($R \geq 1$).

For each of the conventional patterns shown in FIGS. 1, 2 and 3, R has a value of unity. Packing made according to the invention will have R in the range, 6>R>1.05 and more preferably in the range, 3>R>1.2. We estimate that the optimum value will be about 2. However, this is expected to vary as a function of the packing area density and the ratio of the packing baselength to the crimp height, b/h. The corrugation angle is expected to be in the range 20–70 degrees and more typically in the range 30–55 degrees.

Unlike the conventional crimp patterns, the performance of the packing made according to the invention is sensitive to its orientation to the gas and liquid flow. As stated previously, either orientation could potentially be superior depending on the specific application and one can test the packing in both orientations (by simply reinstalling the packing "upside down") to find out which is the appropriate orientation for that specific application. We believe that the optimum orientation in most applications will be that shown in FIG. 4, where the flow sees an oblique face as it approaches the crest and a less steep decline following the crest.

Figure 6:
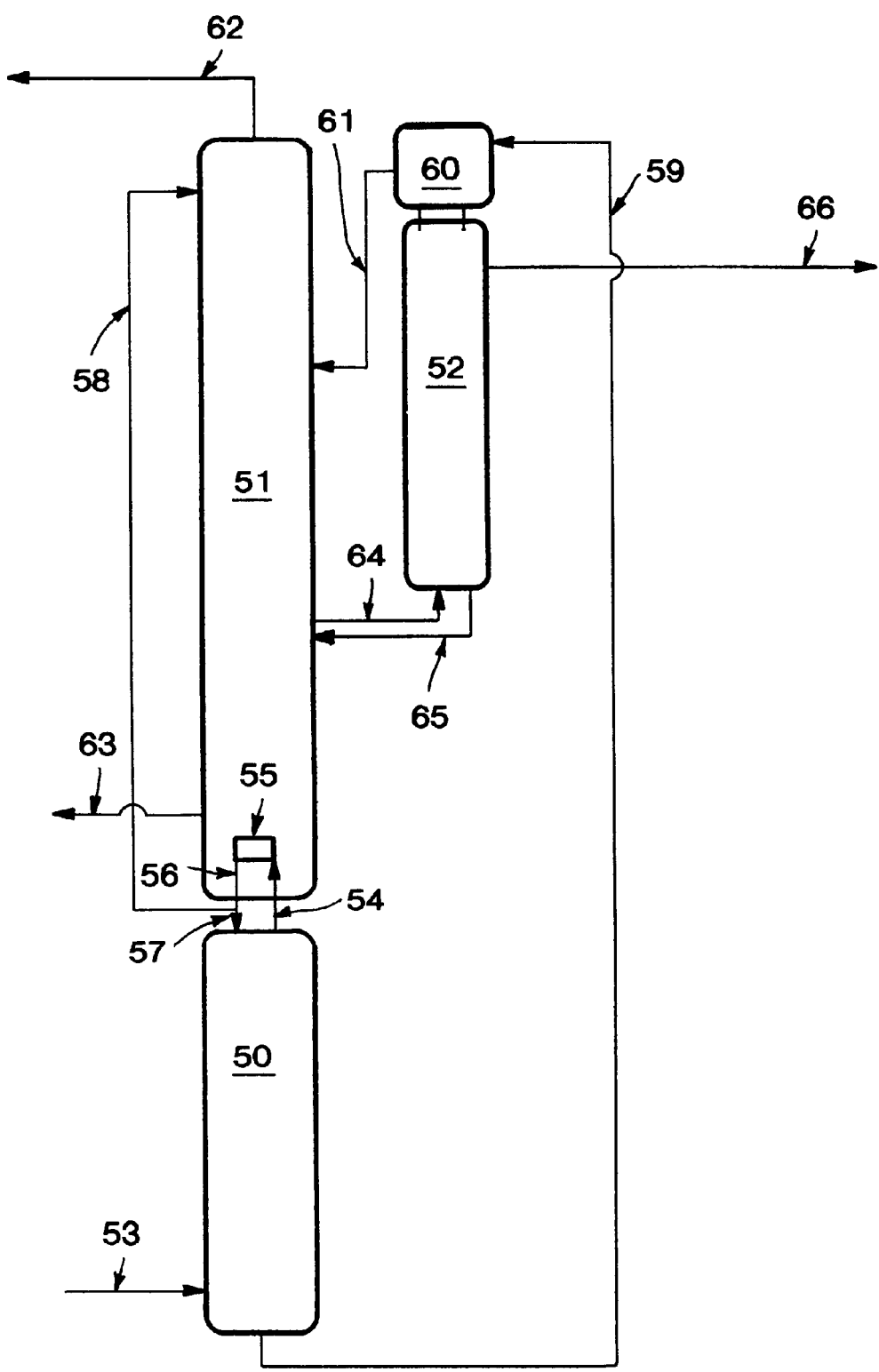
FIG. 6 is a simplified representation of one column arrangement wherein the method of this invention may be carried out.

FIG. 6 illustrates in simplified form a cryogenic air separation plant wherein feed air is separated into one or more products. The feed air comprises, inter alia, oxygen, nitrogen and argon. Nitrogen is more volatile than either argon or oxygen, and argon is more volatile than oxygen. In the arrangement illustrated in FIG. 6, nitrogen, oxygen and crude argon are produced using a cryogenic air separation plant comprising a higher pressure column 50, a lower pressure column 51 and an argon sidearm column 52. One or more of columns 50, 51 and 52 are filled with vertically stacked modules of this invention. Preferably all three of the columns are filled with vertically stacked modules of this invention.

Referring now to FIG. 6, feed air 53 is passed into column 50 wherein it is separated by cryogenic rectification into nitrogen-enriched vapor and oxygen-enriched liquid. Nitrogen-enriched vapor is passed as stream 54 into main condenser 55 wherein it is condensed by indirect heat exchange with column 51 bottom liquid. Resulting nitrogen-enriched liquid 56 is passed into column 50 as reflux liquid 57 and into column 51 as reflux liquid 58. Oxygen-enriched liquid is passed in stream 59 into argon condenser 60 wherein it is at least partially vaporized and then passed into column 51 as shown by stream 61. Within column 51 the various feeds are separated by cryogenic rectification into product nitrogen, which is recovered in stream 62, and into product oxygen which is recovered in stream 63. A side stream 64 is passed from column 51 into column 52 wherein it is separated into argon richer fluid and oxygen-richer fluid. The oxygen-richer fluid is passed into column 51 in stream 65 and the argon-richer fluid, after being processed in whole or in part in condenser 60, is recovered as crude argon in stream 66.

Although the invention has been described in detail with reference to certain preferred embodiments those skilled in the art will recognize that there are other embodiments of the invention within the spirit and the scope of the claims.

What is claimed is:

1. A structured packing module comprising a plurality of vertically oriented, diagonally cross-corrugated packing sheets, said sheets being stacked side-by-side such that the direction of the corrugation is reversed in neighboring sheets, each corrugated structured packing sheet having a crimp pattern which is asymmetrical about a line drawn perpendicular to the centerline of the structured packing sheet and through the apex of either a corrugation peak or corrugation trough, and wherein the distance along the centerline from the apex of a corrugation trough to the apex of an adjacent corrugation peak is not evenly divided by the point where the crimp pattern crosses the centerline between said corrugation trough and said corrugation peak.

2. The module of claim 1 having corrugated structured packing sheets wherein the ratio of the longer segment of said distance to the shorter segment of said distance is within the range of from 1.2 to 3.

3. The module of claim 1 wherein each corrugated structured packing sheet is symmetrical about the centerline of the packing sheet.

4. A method for carrying out rectification comprising:

(A) passing a feed mixture comprising a more volatile component and a less volatile component into a column containing a plurality of modules, each module comprising a plurality of vertically oriented diagonally cross-corrugated structured packing sheets, said sheets being stacked side-by-side such that the direction of the corrugation is reversed in neighboring sheets, each structured packing sheet having a crimp pattern which is asymmetrical about a line drawn perpendicular to the centerline of the structured packing sheet and through the apex of either a corrugation peak or corrugation trough, and wherein the distance along the centerline from the apex of a corrugation trough to the apex of an adjacent corrugation peak is not evenly divided by the point where the crimp pattern crosses the centerline between said corrugation trough and said corrugation peak;

(B) carrying out rectification within the column wherein vapor flows upward through the modules and liquid flows downward through the modules whereby the said more volatile component concentrates in the upflowing vapor and the said less volatile component concentrates in the downflowing liquid; and (C) withdrawing first fluid from the upper portion of the column, said first fluid having a concentration of more volatile component which exceeds that of the feed mixture, and withdrawing second fluid from the lower portion of the column, said second fluid having a concentration of less volatile component which exceeds that of the feed mixture.

5. The method of claim 4 wherein the rectification is cryogenic rectification.

6. The method of claim 5 wherein the mixture comprises at least two of oxygen, nitrogen and argon, wherein nitrogen is more volatile than either argon or oxygen, and argon is more volatile than oxygen.

7. The method of claim 4 wherein in each said structured packing sheet the ratio of the longer segment of said distance to the shorter segment of said distance is within the range of from 1.2 to 3.

8. The method of claim 4 wherein the said structured packing sheets are symmetrical about their respective centerlines.

* * * * *